(12) United States Patent
Ishihara et al.

(10) Patent No.: US 12,456,144 B2
(45) Date of Patent: Oct. 28, 2025

(54) SYSTEM FOR RENTING A VEHICLE USING NON-FUNGIBLE TOKENS (NFTs)

(71) Applicant: TOYOTA JIDOSHA KABUSHIKI KAISHA, Toyota (JP)

(72) Inventors: Naoki Ishihara, Nisshin (JP); Kuniaki Murakami, Nagoya (JP); Koji Hetsugi, Toyota (JP); Tomokazu Ishii, Okazaki (JP); Tatsuya Owashi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/483,582

(22) Filed: Oct. 10, 2023

(65) Prior Publication Data

US 2024/0185332 A1    Jun. 6, 2024

(30) Foreign Application Priority Data

Dec. 1, 2022  (JP) .................. 2022-192819

(51) Int. Cl.
| | | |
|---|---|---|
| *G06Q 30/0645* | (2023.01) | |
| *G06F 21/00* | (2013.01) | |
| *G06Q 20/06* | (2012.01) | |
| *G06Q 20/32* | (2012.01) | |
| *G06Q 20/36* | (2012.01) | |
| *G06Q 20/38* | (2012.01) | |
| *G07F 17/00* | (2006.01) | |

(52) U.S. Cl.
CPC ..... *G06Q 30/0645* (2013.01); *G06Q 20/3825* (2013.01); *G06Q 20/389* (2013.01)

(58) Field of Classification Search
CPC ........... G06Q 30/0645; G06Q 20/3825; G06Q 20/389; G06Q 20/0655; G06Q 20/3278; G06Q 20/3674; G07F 17/0057; G06F 21/00
USPC ......................................................... 705/44
See application file for complete search history.

(56) References Cited

U.S. PATENT DOCUMENTS

| | | | | |
|---|---|---|---|---|
| 2022/0366061 | A1* | 11/2022 | Spivack | ................. H04L 9/3271 |
| 2023/0045071 | A1* | 2/2023 | Kalaldeh | ............... G06Q 30/018 |
| 2023/0100422 | A1* | 3/2023 | Jakobsson | ........ G06Q 20/38215 |
| | | | | 705/67 |
| 2023/0370267 | A1* | 11/2023 | Foligno | ................... H04L 9/083 |

FOREIGN PATENT DOCUMENTS

JP    2022-034652 A    3/2022

* cited by examiner

*Primary Examiner* — Clifford B Madamba
(74) *Attorney, Agent, or Firm* — Oliff PLC

(57) ABSTRACT

A server includes a storage device and a processor. The processor is configured to receive an issue request to issue, in association with a first non-fungible token that has been issued and recorded in a distributed ledger, one or more second non-fungible tokens, and perform an issue process to issue the one or more second non-fungible tokens in response to receiving the issue request. The first non-fungible token and the one or more second non-fungible tokens each include information representing authority to rent a vehicle and representing points to be consumed when the vehicle is rented. The points are shared among the first non-fungible token and the one or more second non-fungible tokens.

4 Claims, 5 Drawing Sheets

SYSTEM FOR RENTING A VEHICLE USING NON-FUNGIBLE TOKENS (NFTs)

This nonprovisional application is based on Japanese Patent Application No. 2022-192819 filed on Dec. 1, 2022 with the Japan Patent Office, the entire contents of which are hereby incorporated by reference.

BACKGROUND

Field

The present disclosure relates to a server.

Description of the Background Art

Japanese Patent Application Laid-Open No. 2022-34652 discloses an information processing system. This system manages authorization for using objects. Information about such authorization may be managed using tokens issued on the block chain.

SUMMARY

As an example of a token that is issued (minted) using a distributed ledger technology such as a block chain technology, an NFT (Non-Fungible Token) is drawing attention. It is extremely difficult to forge or tamper with NFT. The NFT may be associated with a tangible object and used as a certificate for certifying the authority to rental the tangible object. There is a demand for a technique for improving user convenience with respect to rental of tangible objects based on NFT.

The present disclosure has been made to solve the above-described problems, and an object of the present disclosure is to improve user convenience with respect to rental of tangible objects when NFT is used as a certificate for certifying authorization to rental tangible objects.

A server of the present disclosure includes a storage device and a processor. The storage device holds a distributed ledger in which a non-fungible token is recorded. The processor is configured to receive an issue request to issue, in association with a first non-fungible token that has been issued and recorded in the distributed ledger, one or more second non-fungible tokens, and perform an issue process to issue the one or more second non-fungible tokens in response to receiving the issue request. The first non-fungible token and the one or more second non-fungible tokens each include information representing authority to rent an object and representing points to be consumed when the object is rented. The points are shared among the first non-fungible token and the one or more second non-fungible tokens.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
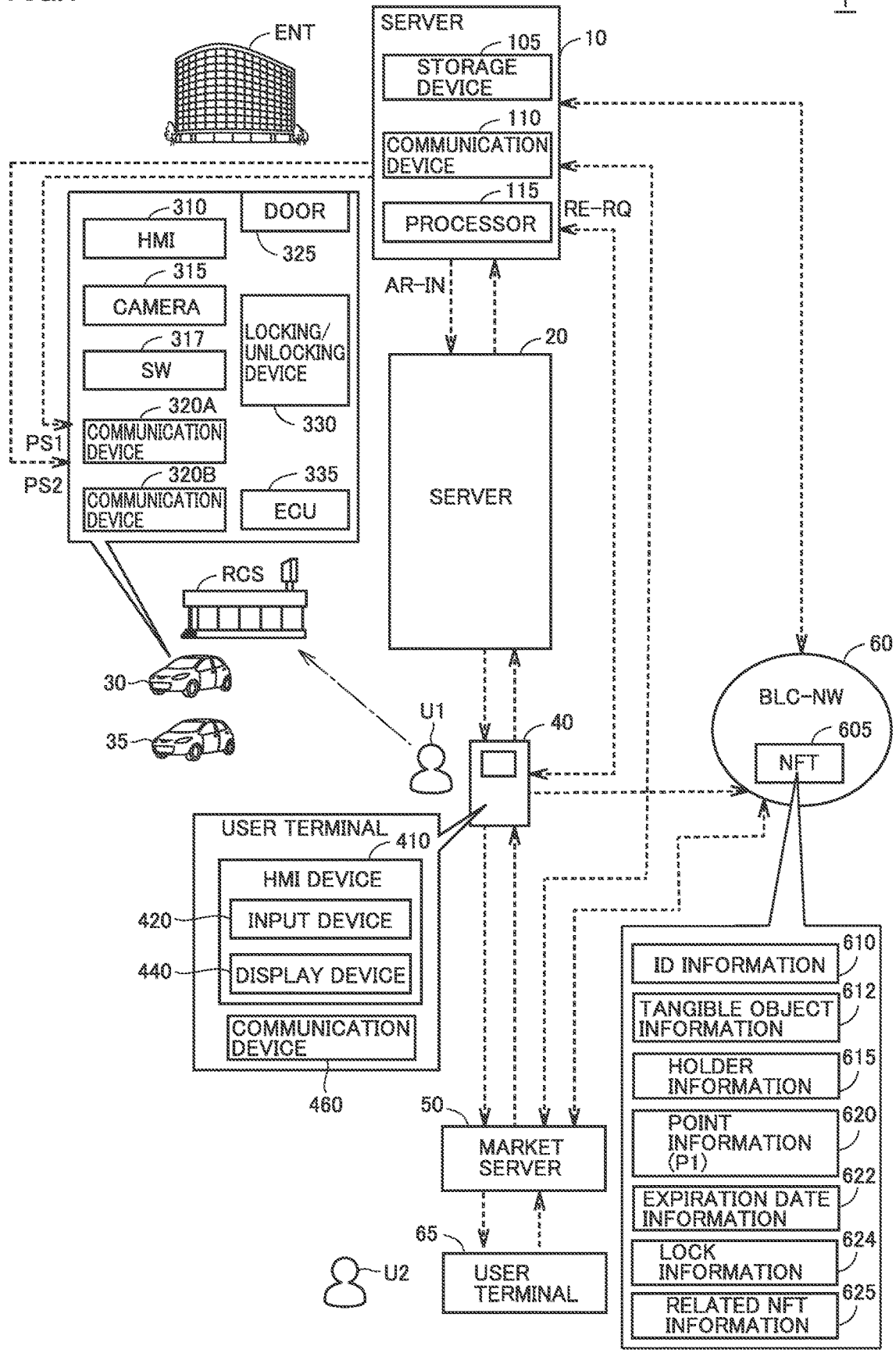
FIG. 1 is a diagram schematically showing a configuration of an information processing system according to an embodiment.

Hereinafter, embodiments of the present disclosure will be described in detail with reference to the accompanying drawings. The same or corresponding parts in the drawings are denoted by the same reference numerals, and description thereof will not be repeated. In an embodiment, as an example, the tangible object is a vehicle.

FIG. 1 is a diagram schematically showing a configuration of an information processing system according to an embodiment. Referring to FIG. 1, information processing system 1 includes servers 10 and 20, vehicles 30 and 35, and user terminals 40 and 65. The information processing system 1 further includes a market server 50 and a block chain network 60 (more specifically, a plurality of nodes thereof). The block chain network 60 is also referred to as a "BLC-NW 60".

The server 10 is operated by an operator ENT. The operator ENT manages the NFT issued on the BLC-NW 60. The operator ENT provides rental services of the vehicles 30, 35 using the NFT. The vehicle 30 is a public vehicle, and the vehicle 35 is a high-level vehicle. In the following description, the vehicle 30 is mainly used. The server 10 may also function as a node of the BLC-NW 60. The server 10 corresponds to the "server" of the present disclosure. The server 10 includes a storage device 105, a communication device 110, and a processor 115.

The storage device 105 stores programs and data to be executed by the processor 115. The storage device 105 further holds a distributed ledger (described later) for recording the NFT. The communication device 110 is configured to receive a request RE-RQ requesting rental of the vehicle 30 from an arbitrary terminal device (for example, the user terminal 40). The request RE-RQ includes sender information indicating the sender. Upon receiving the request RE-RQ, the communication device 110 transmits a deployment command AR-IN for instructing deployment (including maintenance and cleaning) of the vehicle 30 to the server 20.

The processor 115 includes a CPU (Central Processing Unit) and a memory. The memory includes a ROM (Read Only Memory) and a RAM (Random Access Memory).

The processor 115 transmits transaction data (also abbreviated as "TX data") for issuing an NFT on the BLC-NW 60 to the BLC-NW 60 through the communication device 110. Transmitting the TX data to the BLC-NW 60 corresponds to broadcasting the TX data to each node (not shown) of the BLC-NW 60. After broadcast, the TX data is propagated, captured and approved to other nodes of the BLC-NW 60.

The server 20 is operated by a rental store RCS that stores the vehicles 30, 35. In response to the deployment command AR-IN, the server 20 instructs the employee to deploy the vehicle 30.

The vehicle 30 includes an HMI device 310, a camera 315, a start/stop switch (SW) 317, and communication devices 320A and 320B. Vehicle 30 further includes door 325, locking/unlocking device 330, and ECU (Electronic Control Unit) (an onboard device) 335.

The HMI device 310 is a notification device for displaying various screens. The camera 315 captures an imaging target. The SW 317 is turned on/off to start/stop the traveling system of the vehicle 30.

The communication device (first communication device) 320A is configured to communicate with the server 10 via a network (not shown). The communication device 320A is configured to receive a permission signal PS1 to permit unlocking and locking of the vehicle 30 (more specifically, the door 325) from the server 10. The communication device 320A is configured to be able to receive a start permission signal PS2 to permit starting of the vehicle 30 (more specifically, the traveling system) from the server 10.

The communication device (second communication device) 320B is configured to communicate with a mobile terminal device (for example, the user terminal 40) around the vehicle 30 by near field communication. The communication device 320B is further configured to communicate with the user terminal 40 via at least one of near field communication and wired communication. For example, the communication device 320B is configured to receive an unlock request signal for requesting unlocking of the vehicle 30 or an unlock request signal for requesting locking from the user terminal 40. The door 325 is locked before receiving the unlock request signal. The communication device 320B is configured to receive a start request signal requesting starting of the vehicle 30 from the user terminal 40. The locking/unlocking device 330 is controlled to lock or unlock the door 325.

The ECU 335 controls unlocking and locking of the vehicle 30. The ECU 335 is configured to perform unlocking or locking of the vehicle 30 in response to receiving the unlock request signal or the locking request signal from the user terminal 40 through the communication device 320B after receiving the permission signal PS1 through the communication device 320A.

The ECU 335 controls start and stop of the vehicle 30. The ECU 335 is configured to inhibit starting of the vehicle 30 before receiving the start permission signal PS2 through the communication device 320A. After receiving the start permission signal PS2, the ECU 335 executes starting of the vehicle 30 in response to reception of a start request signal from the user terminal 40 through the communication device 320B.

The user terminal 40 is a terminal device including an HMI device 410 and a communication device 460. The HMI device 410 receives an input of a user operation and displays various setting screens. The communication device 460 communicates with an external device of the user terminal 40, such as the servers 10 and 20 or the market server 50. When the user U2 performs an operation for renting the vehicle 30 using the HMI device 410, the communication device 460 transmits a request RE-RQ to the server 10.

The market server 50 functions to provide an NFT marketplace to be used for NFT trade (department and bidding). The market server 50 transfers the NFT from the NFT advertiser (NFT assignee) to the NFT advertiser (NFT assignee) when a condition for bidding the output NFT is satisfied. Transfer of the NFT means transfer of the NFT from the wallet of the NFT assignee to the wallet of the NFT assignee.

The user terminal 65 is configured to communicate with the market server 50 and is used by the user U2 to buy various NFTs through the marketplace. The user terminal 65 is configured to communicate with each node of the BLC-NW 60.

The BLC-NW 60 is a public block chain network. Each node of the BLC-NW 60 holds a distributed ledger and can be accessed by each of the server 10 and the user terminals 40, 65 as well as other terminal devices. The distributed ledger contains TX data for the NFT and is confirmed by the server 10.

The NFT 605 (first non-fungible token) is an issued NFT recorded in the distributed ledger of the node of the BLC-NW 60. The NFT 605 is linked to the vehicle 30. The NFT 605 is used as a certificate for certifying authority to rental the vehicle 30 (rental authority). The NFT 605 is held by the user U1. That is, the user U1 has rental authorization based on the NFT 605.

The NFT 605 includes ID (Identification) information 610, tangible object information 612, holder information 615, point information 620, expiration date information 622, lock information 624 and related NFT information 625. These information may be referenced by any terminal device accessible to the BLC-NW 60.

The ID information 610 is used to identify the NFT 605. The tangible object information 612 indicates identification information of the tangible object (the vehicle 30 in this example) associated with the NFT 605. The holder information 615 represents identification information of the holder (NFT holder) of the NFT 605. In this example, the NFT holder is user U1.

The point information 620 represents points consumed at the time of rental of the vehicle 30 (e.g., by the NFT holder). The points represent the authority to rental the vehicle 30. The points represented by the point information 620 is also referred to as "points P1". The points P1 is, for example, information indicating the rental enabling time of the vehicle 30, the travelable distance of the vehicle 30 at the time of rental of the vehicle 30, or the number of times of rental of the vehicle 30, but is not limited thereto.

The expiration date information 622 indicates the expiration date of the points P1. The expiration date may motivate the NFT holder to use up points P1 before the expiration date. The lock information 624 indicates whether or not the NFT 605 is locked. The locking of the NFT is to make it impossible to transfer the NFT from the wallet of the holder of the NFT to the other wallet. When the NFT is locked, transfer of the NFT is prohibited. The related NFT information 625 indicates information of another NFT associated with the NFT 605 (described in detail later).

The NFT 605 is used as a certificate for certifying the authority to rental the vehicle 30 (rental authority). With respect to rental authorization based on the NFT 605, it is preferred to improve user convenience.

The processor 115 of the server 10 according to the embodiment receives an issue request from the user terminal 40 through the communication device 320A for issuing one or more sub-NFTs (second non-fungible tokens) on the BLC-NW 60 in association with the NFT 605 (first non-fungible token). The issuing request includes issuing number information indicating the number of sub-NFTs issued and first amount information indicating a first amount (described later). The number of publications and the first amount are specified by the user U1 using the HMI device 410. The processor 115 executes the issuing process in response to reception of the issuing request. The issuing process is a process for issuing one or more sub-NFTs and recording the one or more sub-NFTs in the distributed ledger. Each sub-NFT includes information indicating points, similar to the NFT 605. Processor 115 performs the issuing process such that points P1 are shared among NFT 605 and one or more sub-NFTs. The expression "sharing points" means that points P1 may be consumed by either the NFT holder or the sub-NFT holder (sub-NFT holder) during rental of vehicle 30.

According to the issuing process, the rental authority of the vehicle 30 is shared between the NFT holder and the sub-NFT holder. The NFT holder may then consume the points P1 by itself or allow the sub-NFT holder to consume the points P1. Therefore, the convenience of the NFT holder and the sub-NFT holder with respect to the rental of the vehicle 30 can be improved.

In an embodiment, the sub-NFT is issued to split the rental authority (original rental authority) originally owned by the user U1 based on the NFT 605 and transfer a portion of this authority to another person (e.g., the user U2). The sub-NFT can be transferred separately from the NFT 605. The sub-NFT is used as a certificate that proves that the sub-NFT holder has rental authorization for the sub-NFT. When the sub-NFT is issued and transferred from the user U1 to the user U2, a portion of the rental authority is taken over from the user U1 to the user U2 while the user U1 loses a portion of the original rental authority. The sub-NFT holder may operate the user equipment to send the request RE-RQ to the server 10 to rental the vehicle 30.

Figure 2:
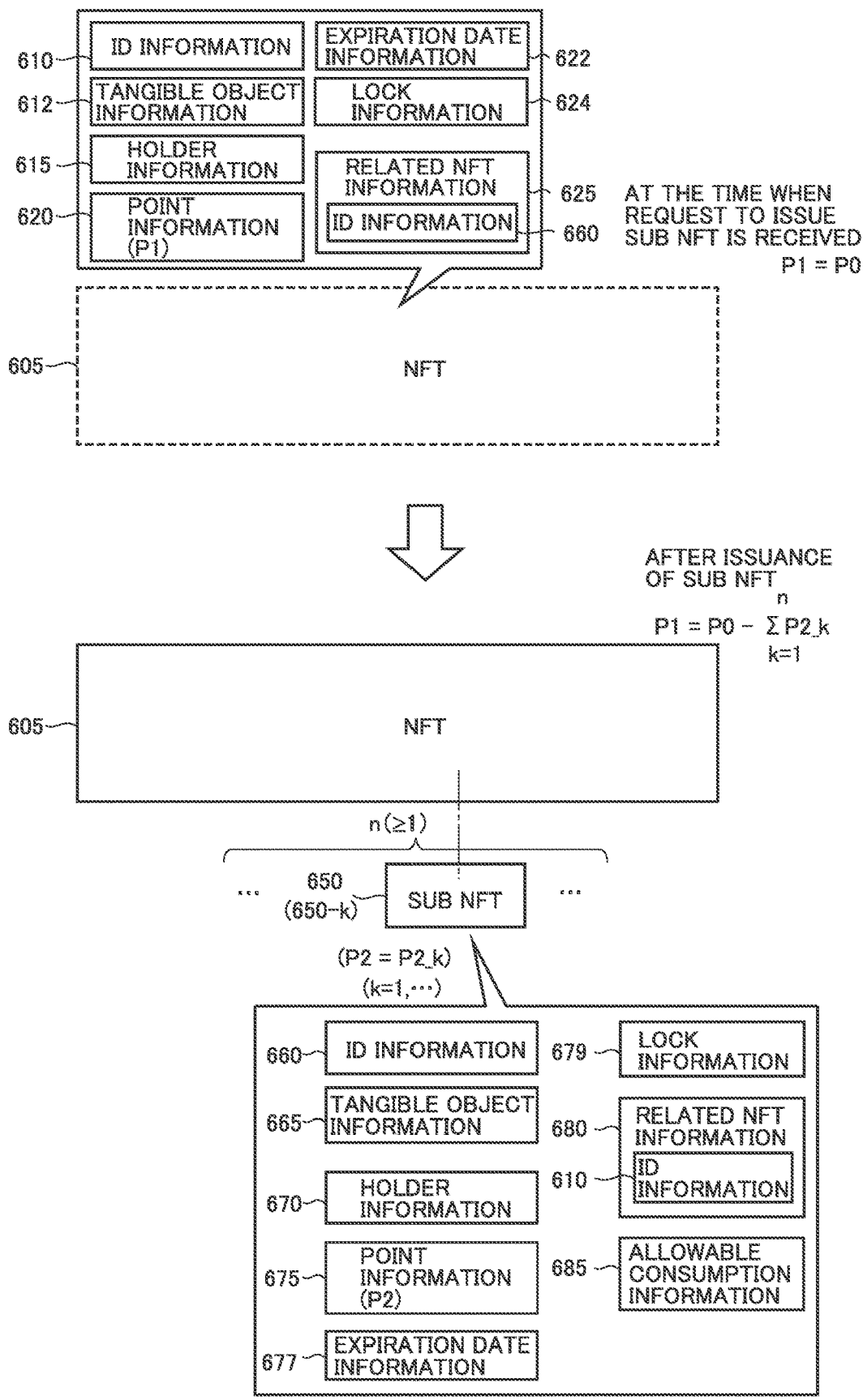
FIG. 2 is a diagram illustrating a data structure of a sub NFT.

FIG. 2 is a diagram illustrating a data structure of a sub NFT. Referring to FIG. 2, in this example, n sub-NFTs 650 (second non-fungible token) are issued (n is a natural number). The number of sub NFTs 650 issued (n) is designated by the user U1 using the HMI device 410 and is included in the issuing request.

The sub NFT 650 includes ID information 660, tangible object information 665, holder information 670, point information 675, expiration date information 677, lock information 679, related NFT information 680, and allowable consumption information 685. These information may be referenced by any terminal device accessible to the BLC-NW 60.

The ID information 660 is used to identify the sub NFT 650. The tangible object information 665 indicates identification information of the tangible object (the vehicle 30 in this example) associated with the sub NFT 650. The holder information 670 indicates identification information of the holder (sub NFT holder) of the sub NFT 650. The sub-NFT holder is the user U1 when issuing the sub-NFT 650, but may then change from the user U1 to another person (e.g., the user U2) by transferring the sub-NFT 650.

The point information 675 represents points consumed at the time of rental of the vehicle 30 (e.g., by the sub-NFT holder). The points represent the authority to rental the vehicle 30. The points represented by the point information 675 is also referred to as "points P2". Similarly to the points P1, the points P2 are information indicating, for example, the rental-enabled time of the vehicle 30, the travelable distance at the time of rental, or the number of rental-enabled times.

The expiration date information 677 indicates the expiration date of the sub NFT 650. The lock information 679 indicates whether or not the sub NFT 650 is locked.

The related NFT information 680 includes information indicating that the sub NFT 650 is associated with the NFT 605 (derivative from the NFT 605), and ID information 610 of the NFT 605. Similarly, the related NFT information 625 of the NFT 605 includes information indicating that the NFT 605 is a derivative of the sub-NFT 650, and ID information 660 of the sub-NFT 650. Thus, each of the related NFT information 625, 680 indicates that the NFT 605 and the sub-NFT 650 are associated (linked) with each other.

The allowable consumption information 685 indicates the allowable consumption amount of the points P1. The allowable consumption amount will be described later in detail in Modified Example 3.

In an embodiment, sharing the points P1 is performed by distributing the points P1 among the NFT 605 and the n sub-NFTs 650 by transferring at least a portion of the points P1 (P0) indicated by the point information 620 included in the NFT 605 to each of the n sub-NFTs 650 when the issue request is received.

Hereinafter, the above-described issuing process will be described in detail. The issuing process includes a first determination process, a first generation process, a first transmission process, a second generation process, and a second transmission process.

The first determination process is to determine, for each of the n sub-NFTs 650, a first amount of points to be transferred from the NFT 650 to the sub-NFT 650 among the points P1. The first amount is equal to points P2 at the time of issuing sub-NFT 650. The first amount may be different for each sub-NFT 650, or may be constant for all sub-NFTs 650. The first amount is included in the issue request as a predetermined value determined by default or a value designated by the user U1 using the HMI device 410.

The first generating process is to generate the first TX data for updating the point information 620 (points P1) included in the NFT 605 by subtracting the first amount (more specifically, the sum thereof) determined corresponding to each of the n sub-NFTs 650 from the points P1. The first transmission process is to transmit the first TX data to the BLC-NW 60.

The second generation process is to generate second TX data for issuing n sub-NFTs 650 each containing point information 675 indicating the determined points P2. The second transmission process is to transmit the second TX data to the BLC-NW 60.

According to the issuing process, updating of the points P1 and issuing of the sub NFT 650 are approved on the BLC-NW 60. Thus, a part of the points P1 can be included as the points P2 in the sub NFT 650. The sub-NFT 650 may be transferred separately from the NFT 605. When the sub-NFT 650 is transferred from the user U1 to the user U2, the points P2 are also transferred to the user U2. As a result, a part of the points P1 is transferred to the user U2 as the points P2 without the NFT 605 being transferred. Thus, a part of the rental authority of the vehicle 30 can be allocated from the user U1 to the user U2 without transferring the NFT 605.

The second TX data may be generated to issue a single sub-NFT 650 or may be generated to issue a plurality of sub-NFTs 650 collectively. When the second TX data for collectively issuing a plurality of sub-NFTs 650 is generated, it is easier to issue N sub-NFTs 650 without errors than when the second TX data for issuing a single sub-NFT 650 is generated a plurality of times. Further, the amount of data processing required to issue N sub-NFTs 650 may be reduced.

In response to receiving the request RE-RQ (FIG. 1), the server 10 performs a lock process for locking the NFT held by the sender of the request. This NFT may be either the NFT 605 or the sub-NFT 650. The lock process corresponds to a request process for requesting the terminal device (for example, the user terminal 40 or 65) of the holder of the NFT to lock the NFT.

In response to the request process, the terminal device transmits TX data for locking the NFT to the BLC-NW 60.

As a result, the TX data is recorded in the distributed ledger, and transfer of the NFT is prohibited.

Locking the NFT prevents the NFT from being sold from the holder (NFT seller) to others through the marketplace during rental of the vehicle 30. As a result, it is possible to prevent the NFT seller from improperly renting the vehicle 30 without the NFT after selling the NFT.

Figure 3:
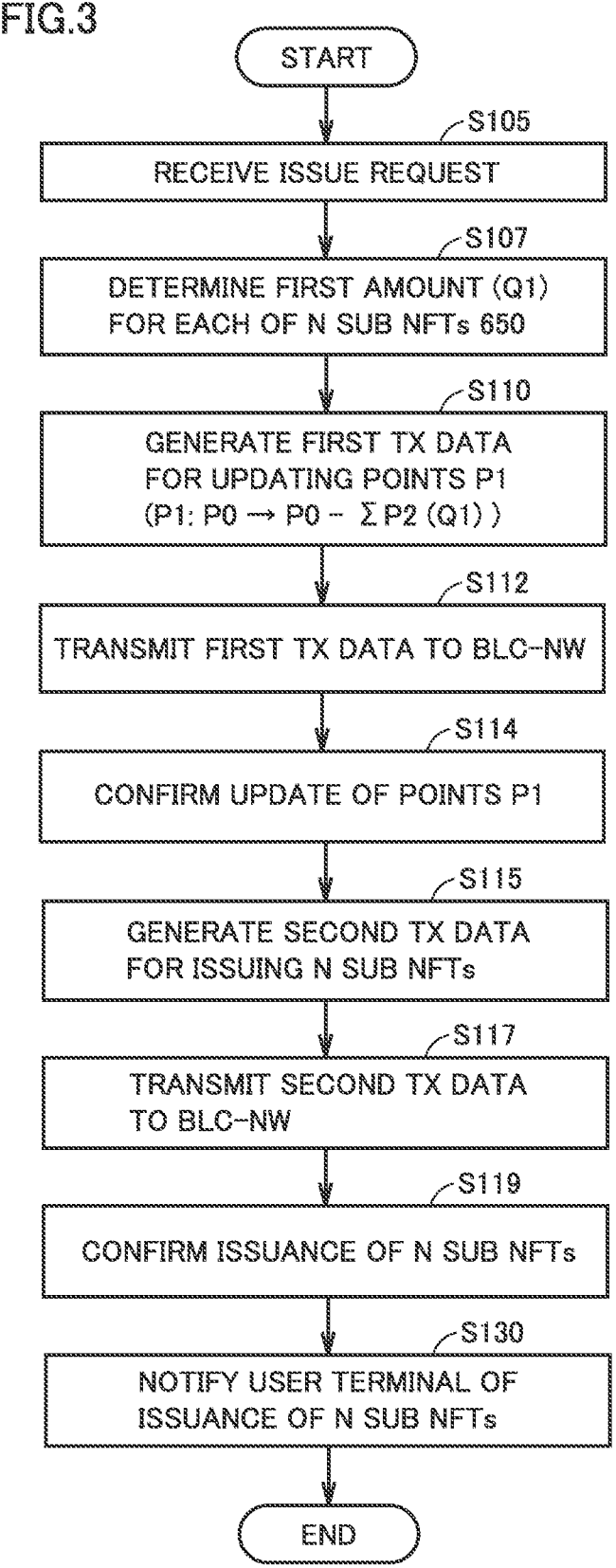
FIG. 3 is a flowchart illustrating processing executed by a server according to the embodiment.

FIG. 3 is a flowchart illustrating processing executed by the server 10 according to the embodiment. Referring to FIG. 3, server 10 receives the above-described issuing request (S105). The issuing request includes the aforementioned issuing number information and first quantity information.

The server 10 determines a first amount (Q1) for each of the n sub-NFTs 650 (S107). The server 10 generates first TX data for updating the points P1 by subtracting the first amount (more specifically, the sum thereof) from the points P1 (S110). The server 10 transmits the first TX data to the BLC-NW 60 (S112). The server 10 refers to the distributed ledger recorded in the node of the BLC-NW 60 and confirms the update of the points P1 (S114).

The server 10 generates second TX data for issuing n sub-NFTs 650 (S115). The server 10 transmits the second TX data to the BLC-NW 60 (S117). The server 10 confirms the issue of n sub-NFTs 650 by referring to the distributed ledger (S119). The server 10 notifies the user terminal 40 of the issuing of the n sub-NFTs 650 (S130), and ends the processing.

As described above, according to the embodiment, convenience relating to transfer of rental authority can be improved.

[Modified Example 1] The server 10 may be configured to transmit the permission signal PS1 to the ECU 335 through the communication device 320A in response to a subject NFT of the NFT 605 and the n sub-NFTs 650 being locked (first permission process). The subject NFT is an NFT held by the sender of the request RE-RQ (specifically, the user of the terminal apparatus that is the source of the request RE-RQ). The terminal device of a holder of the subject NFT (a subject holder) is also referred to as a "holder terminal". In this example, the holder terminal is the user terminal 40 or 65.

The server 10 determines the subject NFT according to the sender information of the request RE-RQ and the holder information 615 or 670. The server 10 determines, for example, an NFT (NFT 605 or sub-NFT 650) having holder information 615 or 670 matching the sender information as a subject NFT. The server 10 determines whether or not the subject NFT is locked based on the lock information 624 or 679 of the subject NFT.

After the first permission process, the door 325 is locked or unlocked in accordance with the unlock request signal or the locking request signal from the holder terminal to the vehicle 30.

After the first permission process, when the unlock request signal is received, the ECU 335 may activate the camera 315. The camera 315 images the driving license presented by the subject holder and including the face photo of the subject holder and the actual face of the subject holder to generate a captured image. The ECU 335 confirms that the subject holder has the driving license by determining in accordance with the captured image that the face photograph matches the actual face. Then, the ECU 335 controls the locking/unlocking device 330 to unlock the door 325. Thus, only when it is confirmed that the subject holder has the driving license after the first permission process, the rental of the vehicle 30 can be permitted to the subject holder. After the confirmation, the ECU 335 may send a confirmation notification to the server 20 indicating that the subject holder has confirmed that the subject holder has a driving license.

Figure 4:
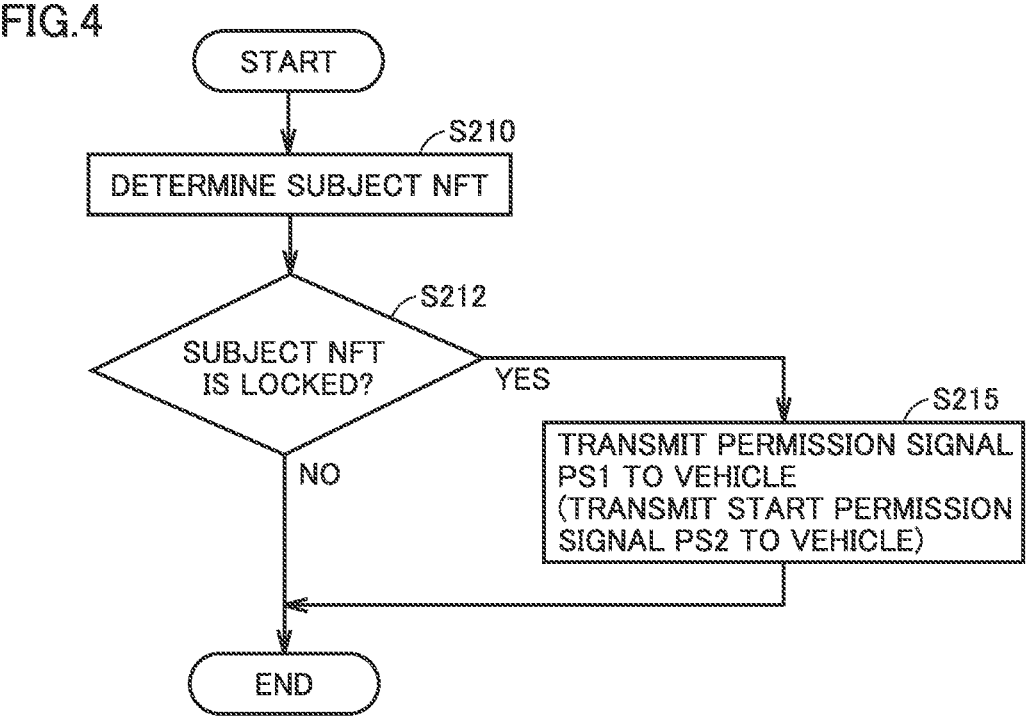
FIG. 4 is a flowchart illustrating processing executed by the server according to the first modification.

FIG. 4 is a flowchart illustrating processing executed by the server 10 according to the first modification. This flowchart starts when the server 10 receives the request RE-RQ.

Referring to FIG. 4, server 10 determines the subject NFT according to sender information of request RE-RQ and holder information 615 or 670 (S210). The server 10 refers to the distributed ledger recorded in the node of the BLC-NW 60, and determines whether or not the subject NFT is locked based on the lock information 624 or 679 of the subject NFT (S212). When the subject NFT is not locked (NO in S212), the server 10 ends the processing. When the subject NFT is locked (YES in S212), the permission signal PS1 is transmitted to the vehicle 30 (S215). Then, the process ends.

According to the first permission process, only when the subject NFT is locked, unlocking and locking of the door 325 by the subject holder is permitted. This makes it possible to appropriately permit rental of the vehicle 30 while avoiding a situation in which the subject NFT is sold during rental of the vehicle 30.

The server 10 may be configured to transmit a start permission signal PS2 to permit starting of the vehicle 30 to the ECU 335 through the communication device 320A in response to lock of the subject NFT (second permission process). In this case, the server 10 transmits the start permission signal PS2 to the vehicle 30 instead of the permission signal PS1 in S215.

According to the second permission process, starting of the vehicle 30 is permitted only when the subject NFT is locked. Thus, similarly to the first permission process, rental of the vehicle 30 can be appropriately permitted.

Modified Example 2

The server 10 may perform point transfer processing in response to receiving a point transfer request for transferring (returning) at least a portion of the points P2 to the points P1. This transfer request is a request for returning at least a part of the points P2 indicated by the point information 675 included in the sub-NFT 650 to the NFT 605 for each of at least one sub-NFT 650 (That is, m sub-NFTs 650 among n sub-NFTs 650 (1≤m≤n)) of the issued n sub-NFTs 650. The point transfer request is generated by the holder of the sub NFT 650 using the terminal device (for example, the user terminal 65) and transmitted from the terminal device to the server 10.

The point transfer processing includes a second determination processing, a third generation processing, a third transmission processing, a fourth generation processing, and a fourth transmission processing.

The second determination process is to determine a second amount of points to be returned from each of the m sub-NFTs 650 to the NFT 650. The second amount may be different for each sub-NFT 650, or may be constant for all sub-NFTs 650. The second amount is included in the point transfer request as all of the remaining amounts of the points P2, a predetermined value determined by default, or a value specified by the holder of the sub-NFT 650.

The third generation process is to generate third TX data for updating the point information 675 (points P2) included in the sub NFT 650 by subtracting the second amount of the sub NFT 650 from the points P2 (P2A) of the sub NFT 650 for each of the m sub NFTs 650. The third transmission process is to transmit the third TX data to the BLC-NW 60.

The fourth generation process is to generate fourth TX data for updating the point information 620 (points P1) included in the NFT 605 by adding the second amount (specifically, the sum thereof) determined corresponding to each of the m sub-NFTs 650 to the points P1 (P1A). The fourth transmission process is to transmit the fourth TX data to the BLC-NW 60.

Figure 5:
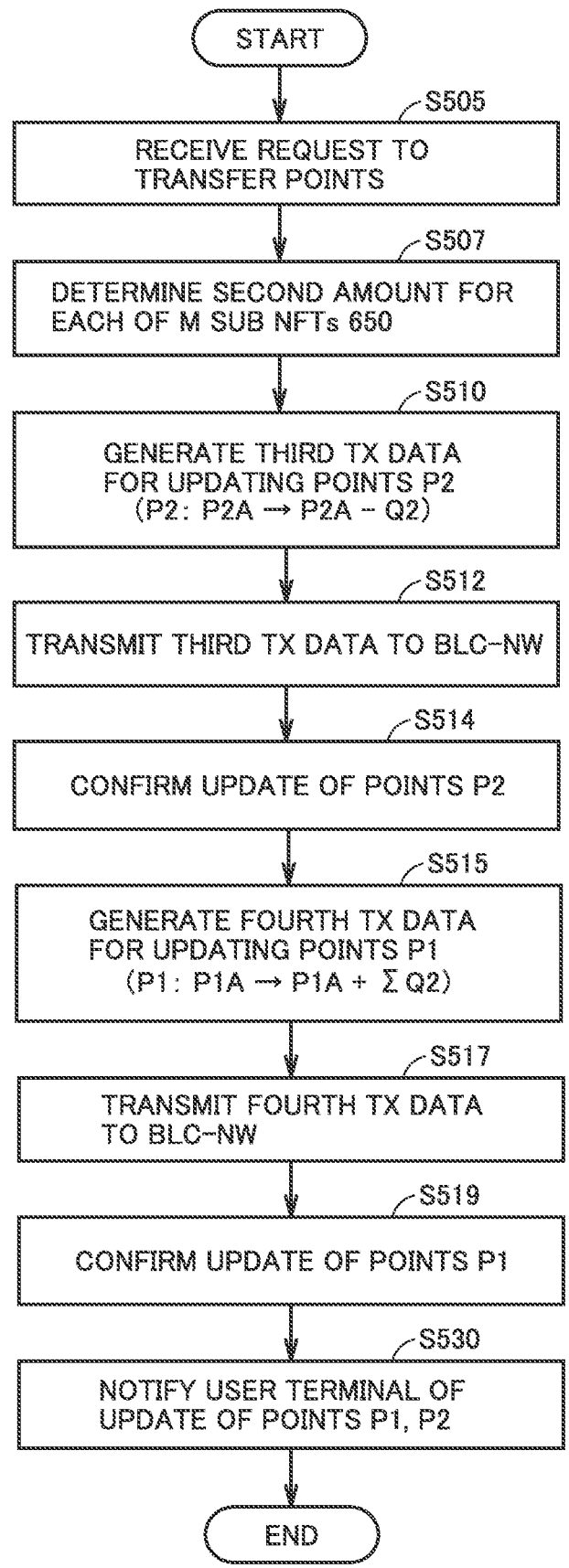
FIG. 5 is a flowchart illustrating processing executed by a server according to a second modification.

FIG. 5 is a flowchart illustrating processing executed by the server 10 according to the second modification. Referring to FIG. 5, server 10 receives a point transfer request (S505). The server 10 determines the second amount (Q2) for each of the m sub-NFTs 650 (S507). The server 10 generates third TX data for updating the points P2 for each of the m sub-NFTs 650 (S510). The server 10 transmits the third TX data to the BLC-NW 60 (S512). The server 10 refers to the distributed ledger and confirms the update of the points P2 for each of the m sub-NFTs 650 (S514).

The server 10 generates fourth TX data for updating the points P1 (S515). The server 10 transmits the fourth TX data to the BLC-NW 60 (S517). The server 10 refers to the distributed ledger and confirms the update of the points P1 (S519). The server 10 notifies the user terminals 40 and 65 of the update of the points P1 and P2 (S530).

According to Modified Example 3, at least a part of the authorization for the sub-NFT 650 can be assigned to the NFT holder again. As a result, the convenience of the NFT holder and the sub-NFT holder can be further improved.

Modified Example 3

"Sharing points" may also include that points P1 is consumed without consumption of points P2 during rental of vehicle 30 by the sub-NFT holder. In this case, even if the remaining amount of the points P2 is 0, the sub-NFT holder can rental the vehicle 30 by consuming the points P1.

The consumption of points P1 by the sub-NFT holder may be limited to less than the acceptable consumption described above. If there are a plurality of sub-NFT holders, the allowable consumption is set, for example, for each sub-NFT holder. Alternatively, the total consumption of each points P2 in a group consisting of a plurality of sub-NFT holders may be limited to be less than the allowable consumption. The allowable consumption amount is set by the user U1 (NFT holder) to be less than the points P1 by using the HMI device 410.

Other Modified Examples

The consumption amounts of the points P1 and P2 may vary depending on the kind of the vehicle to be rental. For example, the consumption amount (the first consumption amount) of the points P1 or the points P2 at the time of rental of the vehicle 30 (the large car) may be smaller than the consumption amount (the second consumption amount) of the points P1 or the points P2 at the time of rental of the vehicle 35 (the high car).

When the server 10 receives the confirmation notification, the server 10 may transmit a notification command for notifying the subject holder of the point information (point information 620 or 675) of the subject NFT to the vehicle 30. The HMI device 310 displays a screen for displaying point information of the subject NFT in response to the notification command. According to the notification command, before the points (points P1 or P2) indicated by the point information becomes 0 (i.e., before the subject holder cannot sufficiently drive the vehicle 30), the subject holder can recognize that effect.

"Sharing points" may be a concept that includes that each of points P1 and P2 may be consumed by either an NFT holder or a sub-NFT holder. In this case, even if the remaining amount of the points P1 is 0, the NFT holder can rental the vehicle 30 by consuming the points P2.

When the expiration date indicated by the expiration date information 622, 677 expires, the server 10 may generate TX data for burning the NFT 605 and the sub 650 and transmit the TX data to the BLC-NW 60.

The tangible objects associated with the NFT are not limited to the vehicles 30, 35. Such tangible objects may be other types of tangible objects, such as pictures, bone goods, jewelry, noble metals, or mobile objects including ships or aircraft.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A system comprising:
a server; and
a vehicle,
the server including:
    a storage device that holds a distributed ledger in which a non-fungible token is recorded; and
    a processor, wherein
    the processor is configured to;
        receive an issue request to issue, in association with a first non-fungible token that has been issued and recorded in the distributed ledger, one or more second non-fungible tokens, and
        perform an issue process to issue and record in the distributed ledger the one or more second non-fungible tokens in response to receiving the issue request,
    the first non-fungible token and the one or more second non-fungible tokens each include information representing authority to rent the vehicle, and representing points to be consumed when the vehicle is rented, and
    the points are shared among the first non-fungible token and the one or more second non-fungible tokens,
the vehicle including:
    a first communication device configured to connect to the server via a network,
    a second communication device configured to connect to a user terminal through near field communication, and
    an onboard device,
    the first non-fungible token and the one or more second non-fungible tokens each further including first information indicating a holder of the non-fungible token and second information indicating whether transfer of the non-fungible token is prohibited,
the server further including a communication device that receives, from a user device, rental request requesting rental of the vehicle, the rental request including sender information indicating a user of the user terminal as a sender of the rental request,
the processor is further configured to:
    determine, among the first non-fungible token and the one or more second non-fungible tokens, a non-fungible token having the first information matching the sender information as a subject non-fungible token held by the user, by referring to the distributed ledger, determine, in accordance with the second information of the subject non-fungible token, whether transfer of the subject non-fungible token is prohibited, by referring to the distributed ledger, and transmit, through the first communication device to the onboard device, a permission signal to permit locking and unlocking of the vehicle, in response to determining that the transfer is prohibited and that the subject non-fungible token is recorded in the distributed ledger as being associated with the user, and wherein the onboard device is configured to:
receive, via the first communication device, the permission signal for renting of the vehicle, the permission signal having been generated based on validation of the transfer prohibition of the subject non-fungible token;
receive, via the second communication device, a request signal from the user terminal indicating a request to unlock or lock the vehicle; and
determine, based on processing of the received permission signal and the received request signal, a condition for locking or unlocking the vehicle.

2. The system according to claim 1, wherein
sharing the points is performed by transferring at least a part of first points represented by the information included in the first non-fungible token when the issue request is received, to each of the one or more second non-fungible tokens, and thereby allocating the first points among the first non-fungible token and the one or more second non-fungible tokens, and the issue process includes:
determining, for each second non-fungible token of the one or more second non-fungible tokens, a first amount of points to be transferred from the first non-fungible token to the second non-fungible token,
subtracting, from the first points, the first amount determined for each second non-fungible token of the one or more second non-fungible tokens, and thereby generating first transaction data for updating the information included in the first non-fungible token, and
generating second transaction data for issuing the one or more second non-fungible tokens each including the information representing the determined first amount of the points.

3. The system according to claim 2, wherein
the processor is further configured to:
for each of at least one second non-fungible token of the issued one or more second non-fungible tokens, receive a transfer request to return, to the first non-fungible token, at least a part of second points represented by the information included in the second non-fungible token;
in response to receiving the transfer request,
determine, for each of the at least one second non-fungible token, a second amount of points to be returned to the first non-fungible token from the second non-fungible token;
for each of the at least one second non-fungible token, subtract the second amount of the second non-fungible token from the second points of the second non-fungible token, and thereby generate third transaction data for updating the information included in the second non-fungible token; and
add, to the first points, the second amount determined for each of the at least one second non-fungible token, and thereby generate fourth transaction data for updating the information included in the first non-fungible token.

4. A system comprising:
a server; and
a vehicle,
the server including:
a storage device that holds a distributed ledger in which a non-fungible token is recorded; and
a processor, wherein
the processor is configured to:
receive an issue request to issue, in association with a first non-fungible token that has been issued and recorded in the distributed ledger, one or more second non-fungible tokens, and
perform an issue process to issue and record in the distributed ledger the one or more second non-fungible tokens in response to receiving the issue request,
the first non-fungible token and the one or more second non-fungible tokens each include information representing authority to rent the vehicle, and representing points to be consumed when the vehicle is rented, and
the points are shared among the first non-fungible token and the one or more second non-fungible tokens,
the vehicle including a first communication device, a second communication device, and an onboard device,
the first communication device is configured to connect to the server via a network,
the second communication device is configured to connect to a user terminal through at least one of near field communication and wired communication,
the first non-fungible token and the one or more second non-fungible tokens each further including first information indicating an holder of the non-fungible token and second information indicating whether transfer of the non-fungible token is prohibited,
the server further including a communication device that receives, from a user device, rental request requesting rental of the vehicle, the rental request including sender information indicating a user of the user terminal as a sender of the rental request,
the processor is further configured to:
determine, among the first non-fungible token and the one or more second non-fungible tokens, an non-fungible token having the first information matching the sender information as a subject non-fungible token held by the user, by referring to the distributed ledger,
determine, in accordance with the second information of the subject non-fungible token, whether transfer of the subject non-fungible token is prohibited, by referring to the distributed ledger, and
transmit, through the first communication device to the onboard device, a start permission signal to permit starting of the vehicle, in response to determining that the transfer is prohibited and that the subject non-fungible token is recorded in the distributed ledger as being associated with the user, and the onboard device is configured to:
  inhibit starting of the vehicle, before receiving the start permission signal;
  receive, via the first communication device, the permission signal for renting of the vehicle, the permission signal having been generated based on validation of the transfer prohibition of the subject non-fungible token;
  receive, via the second communication device, a request signal from the user terminal indicating a request start the vehicle; and
  determine, based on processing of the received permission signal and the received request signal, a condition for starting of the vehicle.

* * * * *